United States Patent
Hodges

(10) Patent No.: US 6,747,581 B2
(45) Date of Patent: Jun. 8, 2004

(54) TECHNIQUES FOR VARIABLE SAMPLE RATE CONVERSION

(75) Inventor: Richard Hodges, Oakland, CA (US)

(73) Assignee: Octiv, Inc., Berkeley, CA (US)

( * ) Notice: Subject to any disclaimer, the term of this patent is extended or adjusted under 35 U.S.C. 154(b) by 366 days.

(21) Appl. No.: 10/066,332

(22) Filed: Feb. 1, 2002

(65) Prior Publication Data

US 2003/0149495 A1 Aug. 7, 2003

(51) Int. Cl.⁷ .................................. H03M 7/00
(52) U.S. Cl. ..................................... 341/61; 341/67
(58) Field of Search .................. 341/61, 143, 144; 375/8, 7, 106

(56) References Cited

U.S. PATENT DOCUMENTS 5,199,046 A * 3/1993 Ling ............................. 375/8
6,061,704 A * 5/2000 Ostman et al. ............. 708/313
6,577,910 B1 * 6/2003 Eastty et al. .................. 700/94

* cited by examiner

Primary Examiner—Brian Young
Assistant Examiner—Joseph Lauture
(74) Attorney, Agent, or Firm—Beyer Weaver & Thomas, LLP

(57) ABSTRACT

Methods and apparatus are described for performing a variable sample rate conversion. A difference between a first sample rate associated with a first signal and a second sample rate associated with a second signal is tracked. A sample rate conversion ratio is adjusted in response to the difference. One of the first and second sample rates is converted using the conversion ratio.

34 Claims, 4 Drawing Sheets

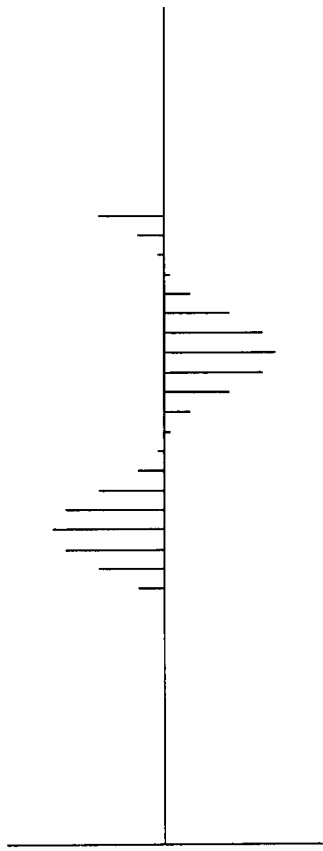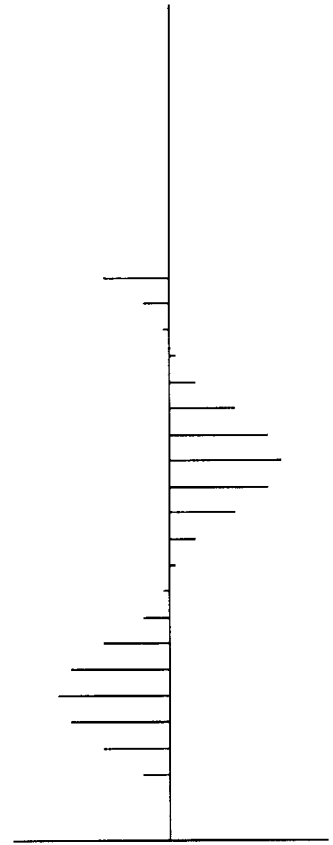

TECHNIQUES FOR VARIABLE SAMPLE RATE CONVERSION

BACKGROUND OF THE INVENTION

The present invention relates generally to sample rate conversion techniques. More specifically, the present invention provides variable sample rate conversion techniques for synchronizing signals having sample rates which change with respect to each other over time.

Sample rate conversion techniques are used in a variety of contexts to facilitate system compatibility and interoperability. Such techniques may involve, for example, passing a sampled signal through a low pass filter, and then resampling the resulting waveform at the desired rate. When performed entirely in the digital domain, such techniques typically involve upsampling the signal, passing the upsampled signal through the digital equivalent of a low pass filter, and then downsampling the filtered signal to the desired sample rate. Commonly, conventional sample rate conversion techniques are employed to convert a signal from one sample rate to a significantly different sample rate, e.g., 36k samples per second to 44k samples per second, the ratio between the two rates, i.e., the sample rate conversion ratio, being fixed.

As digital signal processing techniques become more sophisticated, a variety of contexts are being discovered in which minor variations between sample rates in a system can be problematic for certain signal processing techniques and cause fairly dramatic and perceptible system performance degradation. For example, variations between the sample rates associated with two sound cards on either end of a digital audio transmission in a computer network can cause noticeable degradation in sound quality as well as undesirable delay. In another example, sample rate variations in a single computer system can undermine the operation of an echo cancellation technique which requires two signals to be closely synchronized.

Unfortunately, conventional sample rate conversion techniques are not effective in solving such problems because of the fact that the relationship between the sample rates of the signals to be synchronized are not always fixed. That is, it turns out that the clock rates for different sound cards and even for different circuitry within the same sound card are not only different, but that the difference typically varies over time in unpredictable ways. Thus, a sample rate conversion technique which uses a fixed conversion ratio is obviously not suitable.

In view of the foregoing, it is desirable to provide techniques by which signals having sample rates which vary over time with respect to one another may be synchronized.

SUMMARY OF THE INVENTION

According to the present invention methods and apparatus are provided by which signals having sample rates which vary with respect to each other over time may be synchronized. The drift between the sample rates is monitored and used on an ongoing basis to adjust the conversion ratio for a variable sample rate converter which effects the sample rate synchronization.

Thus, the present invention provides methods and apparatus for performing a variable sample rate conversion. A difference between a first sample rate associated with a first signal and a second sample rate associated with a second signal is tracked. A sample rate conversion ratio is adjusted in response to the difference. One of the first and second sample rates is converted using the conversion ratio.

According to one embodiment of the invention, methods and apparatus are provided for performing echo cancellation. A difference is tracked between a first sample rate associated with a first signal and a second sample rate associated with a second signal. A sample rate conversion ratio is adjusted in response to the difference. The first sample rate is converted using the conversion ratio, thereby generating a modified first signal and facilitating synchronization of the modified first signal and the second signal. Echo cancellation is performed using the modified first signal and the second signal.

According to a more specific embodiment, methods and apparatus are provided for performing echo cancellation. A difference is tracked between a first sample rate associated with a first signal and a second sample rate associated with a second signal by tracking a sample count in which samples associated with the first signal make a positive contribution to the sample count and samples associated with the second signal make a negative contribution to the sample count. A downsampling factor is adjusted using a feedback signal generated by a third order control system with reference to the difference. The first sample rate is converted using an upsampling factor, a filter, and the downsampling factor, thereby generating a modified first signal and facilitating synchronization of the modified first signal and the second signal. Echo cancellation is performed using the modified first signal and the second signal.

A further understanding of the nature and advantages of the present invention may be realized by reference to the remaining portions of the specification and the drawings.

BRIEF DESCRIPTION OF THE DRAWINGS

FIGS. 2A and 2B illustrate two signals to be synchronized according to a specific embodiment of the invention.

DETAILED DESCRIPTION OF SPECIFIC EMBODIMENTS

At the outset, it should be noted that the basic problem solved by the present invention arises in any digital signal processing context in which synchronization, i.e., the same sample spacing, between the samples of two signals is desired. Thus, the present invention should not be limited to the specific contexts described herein which are used for illustrative purposes. In addition, the techniques of the present invention may be implemented in a variety of ways. For example, various embodiments of the invention are implemented entirely in software which may be executed on one or more of any of a wide variety of computer platforms, e.g., personal computers, workstations, servers, embedded digital signal processors, etc., in any of a wide variety of stand-alone or network topologies. However, it will be understood that the basic signal processing blocks of such embodiments may be implemented in other ways and remain within the scope of the invention. For example, these processing blocks may be implemented in application specific integrated circuits (ASICs) or programmable logic devices (PLDs). Hardware implementations of the processing blocks of the present invention is also contemplated.

Figure 1:
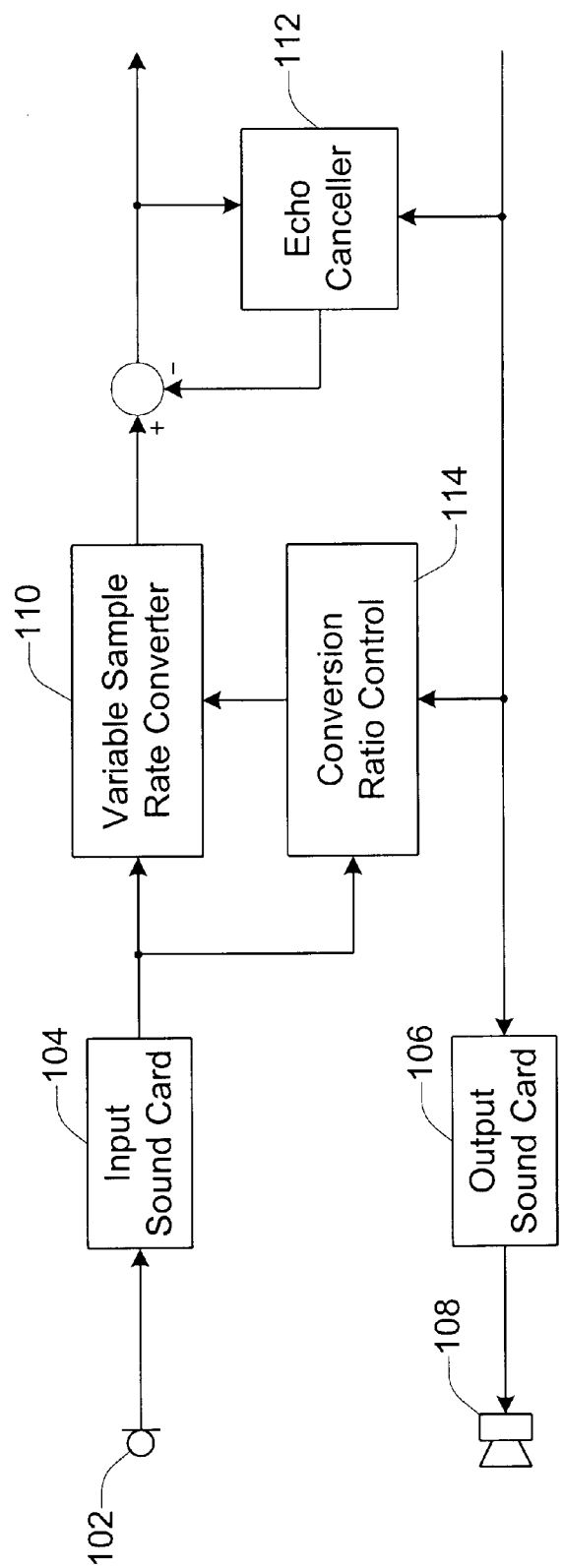
FIG. 1 illustrates an exemplary embodiment of the present invention in the context of an echo cancellation application.

A specific embodiment of the invention will now be described with reference to FIG. 1 which shows equipment for processing acoustic energy. It will be understood that the equipment of FIG. 1 is greatly simplified for illustrative purposes. It will also be understood that the techniques of the present invention may be applied in any of a wide variety of sample rate conversion contexts and that any reference to specific applications in the following description are merely for illustrative purposes. According to the exemplary implementation of FIG. 1, the equipment shown comprises part of one end of a computer telephony system, and the variable sample rate conversion technique of the present invention is employed in the context of a near-end echo cancellation application.

A microphone 102 transmits an analog signal representing detected acoustic energy to input sound card circuitry 104 operation of which is controlled by a clock signal CLK1 (not shown). Thus, the output of sound card circuitry 104 is a digital representation of the detected acoustic energy having a sample spacing which is dependent on CLK1. Operation of output sound card circuitry 106 which drives speaker 108 is controlled by a clock signal CLK2 (not shown). As a result, the input to sound card circuitry 106 has a sample spacing which is dependent upon the rate at which circuitry 106 requires data which, in turn, is dependent on CLK2.

It should be noted that sound card circuitry 104 and 106 may be two separate sound cards or different portions of the same sound card. Regardless of whether one or two sound cards are involved, the salient point for the purposes of this discussion is that the clock signals CLK1 and CLK2 are not synchronized.

This lack of synchronization is problematic in echo cancellation because, in order for such a technique to work properly, the two sample streams to which the technique is applied must be closely synchronized. Where the clock signals employed to generate the two sample streams are different, the samples in the respective signals have different spacings and the energy in one signal cannot reliably be correlated with the energy in the other for cancellation purposes.

If the clock signals are fixed with respect to each other, this problem may be handled using a conventional sample rate conversion technique. Unfortunately, as described above, there are many systems, e.g., personal computer systems, in which the differences between these signals is not fixed. Therefore, according to a specific embodiment of the present invention and as will be described, a variable sample rate conversion technique is provided which tracks and compensates for the drift between the sample rates of two signals.

Generally speaking, near-end echo cancellation techniques are employed to cancel acoustic energy coupled from the near-end speaker (e.g., speaker 108) to the near-end microphone (e.g., microphone 102). This is typically accomplished by generating an estimate of the echo signal from the input to the output sound card (e.g., circuitry 106) and subtracting the estimate from the output of the input sound card (e.g., circuitry 104). As described above, in order for this to work, these two signals must be closely synchronized.

Therefore, according to a specific embodiment of the present invention, a variable sample rate conversion is applied to one of the two signals to effect the necessary synchronization and to do so in the face of changes between their respective sample rates. Referring to FIG. 1, a variable sample rate converter (VSRC) 110 is shown which applies the conversion to the output of sound card circuitry 104. Of course, it will be understood that a reciprocal conversion may instead be applied to the input to sound card circuitry 106 without departing from the scope of the invention.

In the embodiment shown, VSRC 110 receives the output sample stream from sound card 104 (FIG. 2A), converts it to match the sample rate of the input sample stream to sound card 106 (FIG. 2B), and provides the converted signal to echo canceller 112. The signal of FIG. 2B represents acoustic energy captured at a far-end system, and the signal of FIG. 2A represents an attenuated and delayed version of this same energy picked-up by near-end microphone 102 as a result of acoustic feedback and/or echo. The difference between the sample rates shown in FIGS. 2A and 2B is exaggerated for illustrative purposes.

According to the invention, the conversion ratio of VSRC 110 varies to counteract any drift between the sample rates of the two signals as represented by sample rate conversion ratio control block 114. Specific mechanisms by which this control may be achieved are discussed below.

In addition, it should be noted that the inputs to conversion ratio control block 114 may vary according to different embodiments without departing from the scope of the invention. That is, although block 114 is shown receiving the output sample stream of sound card 104 and the input sample stream of sound card 106, other signals may be used to monitor sample rate drift and facilitate adjustment of the sample rate conversion ratio. For example, the drift could be determined with reference to the input sample stream of sound card 106 and the output sample stream of VSRC 110. Alternatively, the drift could be determined with reference to the clock signals CLK1 and CLK2 themselves. It will be understood that these and other alternative are within the scope of the invention.

Echo canceller 112 estimates the echo from the input sample stream to sound card 106 and uses this estimate to effect cancellation of the corresponding energy in the output sample stream from sound card 104. As will be understood, the processing techniques by which this cancellation is achieved are irrelevant to the present invention which relates primarily to the manner in which the synchronization between the two signals used for the echo cancellation is achieved.

That is, the techniques of the present invention may be employed to synchronize any plurality of signals for any signal processing purpose. For example, in a teleconferencing system where acoustic energy is received with multiple microphones, there are a variety of reasons why it would be desirable to synchronize the signals corresponding to the different microphones. One such purpose could be simply the accurate reproduction of the sound on the other end of the conference. Another could be to accurately determine the positions of different speakers in the conference room using sophisticated sonar processing techniques which require synchronization for accuracy.

Another interesting application of the variable sample rate techniques described herein relates to collaborative music applications over wide area networks in which remotely positioned musicians attempt to create music over a network with contributions from two or more remote locations. The need for precise synchrony of the various contributions in such an application is manifest. Another application is the synchronization of multiple audio recordings which must be mixed to produce an audio program such as a musical program or the audio portion of a multimedia program.

Yet another application of the variable sample rate techniques of the present invention relates to the problem encountered when the sample spacing of the input to a sound card is different from the sample spacing of the output of that same sound card. If the samples at the input are more closely spaced than those at the output, incoming samples might have to be dropped to avoid overflowing the sound card's buffers. On the other hand, where the samples at the input are more widely spaced than those at the output, there is a risk of "starving" the sound card. In either case, distortion of the output sound results which is clearly undesirable, especially for high fidelity applications. This problem can be mitigated using the techniques of the present invention (e.g., see the description below relating to FIG. 5).

Figure 3:
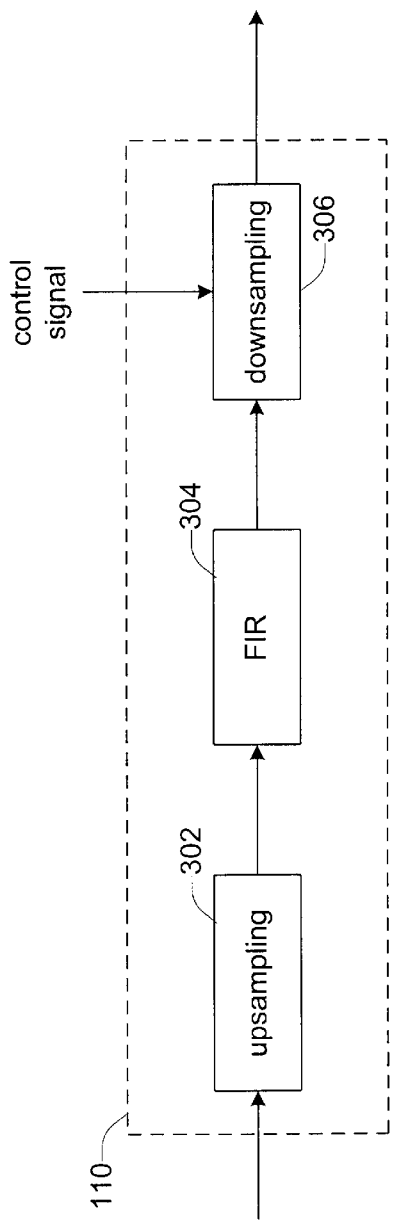
FIG. 3 illustrates a variable sample rate conversion technique according to a specific embodiment of the invention.

A specific embodiment of the operation of VSRC 110 of FIG. 1 will now be described with reference to the diagram of FIG. 3. According to this embodiment which is implemented in the echo cancellation context of FIG. 1, the described technique is used to synchronize the output of sound card 104 with the input to sound card 106. However, it will be understood that sample rate conversion technique described may be employed to synchronize a wide variety of signals in a wide variety of signal processing contexts.

VSRC 110 receives the output sample stream from sound card 104 and upsamples the signal (block 302) by a factor which is determined with reference to at least two competing considerations described below. The resulting signal has all of the samples of the input signal separated by a number of zero amplitude samples. Thus, for example, where the upsampling factor is 64, every sample of the input signal becomes every $64^{th}$ sample of the resulting signal with the intervening 63 samples having zero amplitude.

The upsampled signal is then passed through a low pass filter 304. According to a specific embodiment, filter 304 comprises a finite impulse response (FIR) filter. According to an even more specific embodiment, filter 304 comprises a discrete representation of an ideal filter based on the sinx/x function.

As is well known, the higher the order of such a filter, i.e., the greater the number of filter coefficients, the more ideal its characteristic and therefore, the more accurate a representation the output waveform will be of the information in the original signal. The importance if this consideration relates to the application and the fidelity required for the information represented by the sampled signals. That is, a higher order filter will be required for a high fidelity music system then for a much lower fidelity telephony system.

On the other hand, the greater the number of coefficients, the more computationally expensive the filter becomes. These two competing considerations constrain the sample rate of the signal being processed and thus, the upsampling factor discussed above must be selected with these competing considerations in mind.

In addition, and according to various embodiments, the filter coefficients may be selected or manipulated to alter the filter characteristic to compensate for frequency roll offs which occur other places in the system. Thus, filter 304 may perform double duty to further enhance system performance with negligible addition to computational overhead.

Regardless of the type of low pass filter or the number of coefficients employed, once the upsampled signal has been passed through the filter, the resulting filtered signal is then downsampled (block 306) using a downsampling factor which varies in accordance with the drift between the different clock signals. Some mechanisms by which this variability is achieved are discussed below. It will be understood that while the upsampling factor may be an integer, e.g., 64, the downsampling factor may or may not be an integer. It will also be understood that the downsampling performed in block 306 may be facilitated by using a higher upsampling ratio in block 302 (i.e., there will be more sample points from which to choose). However, as discussed above, a higher upsampling factor requires a greater number of filter coefficients, and more memory to store them.

In any case, the result of this downsampling is a signal derived from the output of sound card 104 but for which the sample rate has been converted to match the sample rate of the output of sound card 106. These two signals can then reliably be used by echo canceller 112 to effect near-end echo cancellation.

According to various embodiments of the invention, several computational advantages may be realized. For example, because the upsampled signal generated by block 302 is a virtual signal, i.e., stored values in memory rather than an actual signal which can be monitored, the samples of zero amplitude in between each of the nonzero samples from the original signal need not be calculated therefore representing a significant savings in computational overhead.

Another reduction in computational overhead relates to the fact that because most of the input samples to the low pass filter comprises zero amplitude samples, not all of the filter coefficients have to be used to calculate each filter output sample. That is, only the filter coefficients corresponding to the nonzero samples of the upsampled signal (i.e., a very small percentage of the total number of samples) need be used.

According to a specific embodiment of the invention, the filter coefficients required for calculating each successive sample of the low-pass-filtered signal are stored in consecutive memory locations resulting in a significant reduction in sample calculation time. According to a more specific embodiment, the blocks of coefficients for successive samples are also stored consecutively in memory resulting in a further reduction in calculation time. This embodiment of the present invention takes advantage of the manner in which conventional computer memory is organized and accessed to make all or a significant portion of the necessary coefficients for a particular calculation available with significantly fewer memory accesses than if the coefficients were randomly stored. It should be noted that depending on the downsampling factor, there may be a need for picking up or dropping an extra sample in which case the corresponding block of coefficients might be skipped or reused. In any case, the blocks of coefficients are nevertheless arranged in the order in which they will be needed.

In one particular implementation of an FIR filter using this technique, the performance of a Pentium III processor rivaled that of a special purpose DSP chip. In this implementation which employed special programming techniques, only slightly more than 3 cycles on the Pentium III were required for a multiply/accumulate operation which compares favorably with the cycle budget in a typical DSP chip implementation. This is to be compared with the typical budget of 10 to 12 cycles for an FIR filter implemented using conventional programming techniques. According to a specific implementation, the programming techniques employed include the ordering of filter coefficients such that all or most of the coefficients simultaneously occupy the cache, e.g., L1 or L2 cache, and making use of the 32 bit×32 bit multiply/accumulate capability of the Pentium III for efficient calculation of the sum-of-products whose value is the output sample data of the sample rate conversion operation.

As discussed above, the downsampling factor of the present invention varies in a manner which is related to the variability between the sampling rates for the two signals being synchronized. In the context of the echo cancellation application of FIG. 1, for example, this variability is largely due to the drift between the clock signals CLK1 and CLK2. In addition, the effect of such drift is exacerbated in many computing systems by the fact that sound card drivers do not typically transmit audio samples at regular intervals, i.e., successive packets of samples may contain different numbers of samples, or the timing between bursts of packets from one sound card to those of the other is often unpredictable. These effects make it very difficult to track the drift between the sample rates.

Therefore, according to various embodiments of the invention, a running difference is tracked between the accumulated samples of a first signal and the accumulated samples of a second signal from which the drift between the sample rates associated with the two signals is then determined. Referring back to the echo cancellation application of FIG. 1 and according to one such embodiment, the first and second signals may correspond to the input to sound card 106 and the output from sound card 104, respectively. According to various other embodiments relating to echo cancellation applications, either of the first and second signals may be derived from these two signals. For example, one signal may be the output of the variable sample rate conversion, while the other may comprise an echo estimate signal. Alternatively, the respective clock signals by which the different sample streams are generated may be employed.

Figure 4:
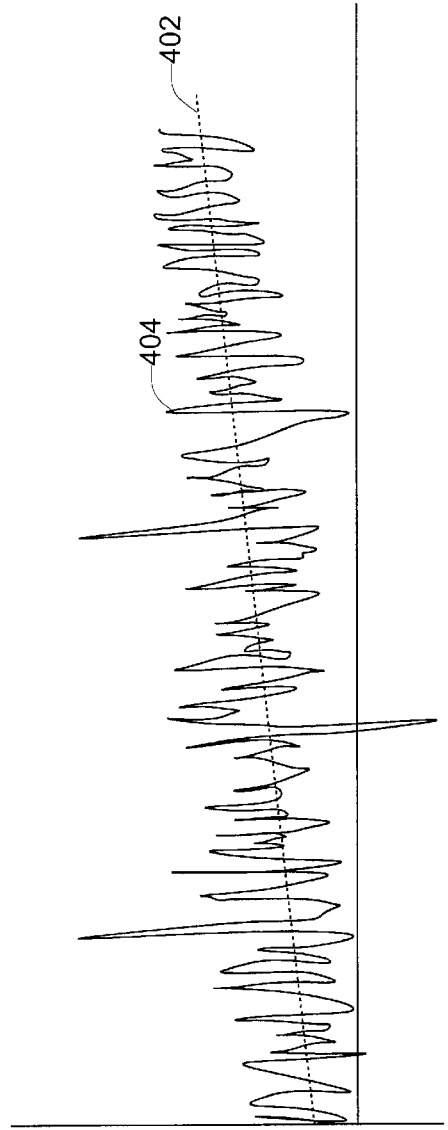
FIG. 4 shows a representation of a difference signal according to a specific embodiment of the invention.

More generally, as each packet of samples from either of the signals is received, the number of samples is either added to or subtracted from the running total depending upon to which of the two signals the packet corresponds. If there is no difference between the sample rates, the running total should theoretically converge to zero over time. However, a drift between the sample rates would show up as a diagonal trend 402 (i.e., a rate of change or slope) reflecting the magnitude and time-varying nature of the drift as shown in the exemplary graph 404 of FIG. 4.

According to various embodiments, measurement of this rate of change may be accomplished, for example, by deriving an average value for the running difference, or using any of a variety of quantitative techniques such as, for example, least-mean-squares analysis, cluster analysis, and histogram analysis. However, for embodiments of the present invention relating to echo cancellation in computer networks, such techniques may not adequately deal with the unpredictable manner in which samples are generated. That is, because of the erratic way in which samples are generated by the respective sound cards, local distortion due to outliers and an undesirably long convergence time undermine the efficacy of such approaches.

Thus, according to a more specific embodiment, the median value for a given window of the difference curve (e.g., graph 404) is determined, all values of the curve which lie outside of a distance from the median selected by experimentation under a variety of conditions are discarded, and the average of the remaining values is determined. That is, the distortion due to outliers is mitigated by their removal.

The resulting average value may then be used to determine the difference between the sample rates of the two signals, i.e., the drift, which, in turn, may be used to calculate the downsampling factor for the variable sample rate conversion described above.

According to a more specific embodiment, the average values of the difference signal are employed in a feedback system which is used to update the sample rate conversion ratio (i.e., the upsampling factor divided by the downsampling factor) on an ongoing basis to keep the difference signal tending to zero. That is, according to one embodiment, the current estimate of the sample rate ratio is used to make adjustments to the downsampling factor such that the average values of the difference signal stays as close to zero as possible, i.e., roughly the same number of samples are accumulated for both of the signals over a given period of time.

According to an even more specific embodiment, the difference signal, i.e., the signal tracking the accumulated samples for the two signals being synchronized (e.g., graph 404), is generated using the sample-rate-converted version of one of the two signals. That is, the difference signal is generated after the sample rate conversion which, if done using the appropriate conversion ratio, results in a difference signal which tends toward zero. Feedback techniques are then applied on an ongoing basis to adjust the conversion ratio, i.e., either of the upsampling or downsampling factors, to keep the difference signal tending toward zero.

As will be understood, different order feedback control loops may be employed to use the difference signal to adjust the sample rate conversion ratio. For example, a first order control loop might make a fixed incremental adjustment to the downsampling factor based on the difference signal average deviating from zero by more than some threshold amount. Alternatively, the amount by which the downsampling factor is adjusted might be in proportion to the amount by which the difference signal average deviates from zero.

According to various embodiments, a third order control loop uses the integral with respect to time of the difference signal as feedback to effect adjustment of the conversion ratio resulting in relatively rapid convergence of the difference signal to zero. According to one such embodiment, dynamic convergence of the difference signal to zero is effected by manipulating the parameters of the third order control loop to cause more rapid or slow convergence depending upon how far away from zero the difference signal is. That is, initially, when the difference between the sample rates is likely the greatest, the control loop parameters might be set to effect more rapid convergence. However, as the difference signal gets closer to zero, the parameters may be adjusted to effect a slower convergence. The tradeoff with the speed of convergence is that with faster convergence the system is more sensitive to noise. So, initially, when the difference between the sample rates of the two relevant signals is typically the greatest, the need for speed may sufficiently override noise concerns. However, as the sample rates converge using the variable sample rate conversion of the present invention, the need to decrease the susceptibility of the system to noise will typically be more important.

Figure 5:
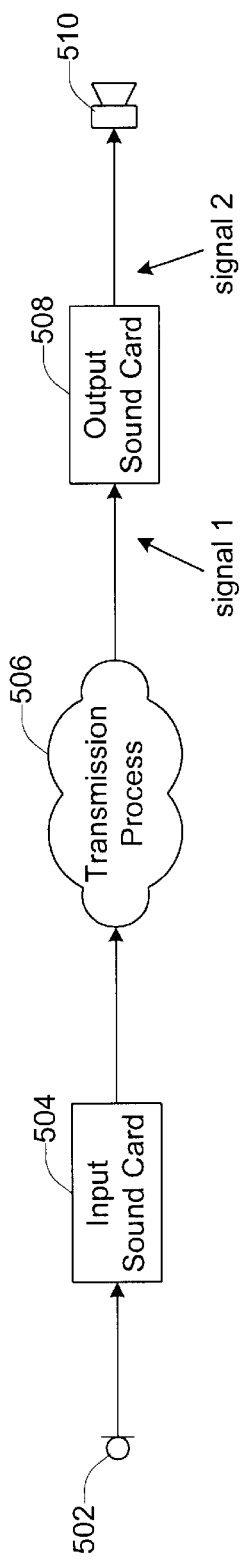
FIG. 5 is a simplified block diagram of an exemplary context in which the present invention may be practiced.

As mentioned above, there is a wide variety of contexts in which the present invention may be employed. The echo cancellation application discussed with reference to FIG. 1 is one such context. Another is shown in FIG. 5 in which acoustic energy is captured and converted using a microphone 502, processed by a sound card 504, subjected to a transmission process 506 (e.g., a wide area network), received by a sound card 508, and converted back to acoustic energy by speaker 510. In such a scenario, the two signals for which synchronization may be achieved using the present invention are, respectively, the input and output signals of sound card 508. That is, the techniques of the present invention may be used to cause the sample rate at the input to sound card 508 to converge with the sample rate at its output. This avoids situations in which samples "pile up" at the card's input (thus resulting in an increasing delay between when acoustic energy is captured by microphone 502 and when it is played over speaker 510). It also avoids situations in which sound card 508 is "starved" for samples.

It should be noted that for embodiments such as the one describe above with reference to FIG. 5, the accuracy with which the signals of interest are synchronized may not have to approach that necessary in other contexts, e.g., echo cancellation. That is, if the system of FIG. 5 is for the transmission of voice, keeping the accumulated drift between the signals within 5 samples of each other might be sufficient, whereas, if the system of FIG. 5 is for the high fidelity transmission of music, a greater level of synchronization would be desirable. The level of synchronization in the context of echo cancellation where the sample rates must match very closely might even be greater. Therefore, different combinations of the various aspects of the invention discussed herein, e.g., the rejection of outliers in the difference signal and the use of third order feedback, may be employed in different contexts and remain within the scope of the invention.

Figure 6:
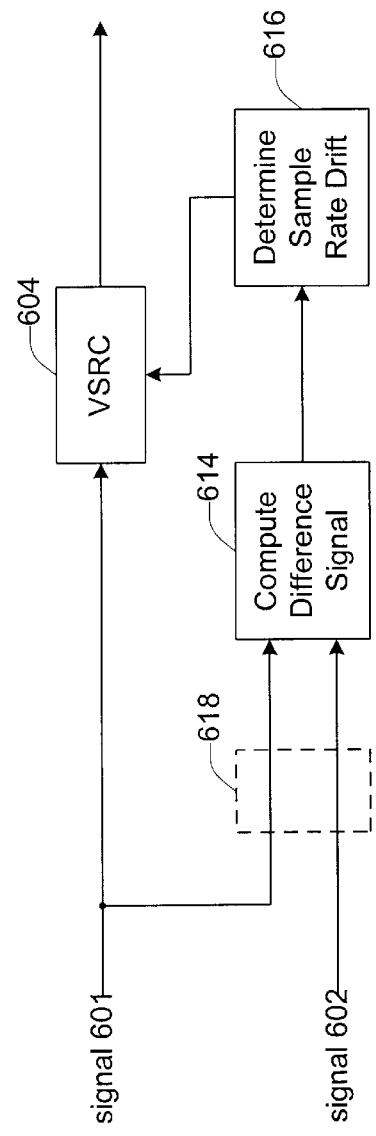
FIG. 6 is a block diagram illustrating a technique for adjusting a sample rate conversion ratio associated with a variable sample rate converter designed according to the present invention.

A specific embodiment of the present invention in a generic signal processing context will now be described with reference to FIG. 6. First and second signals 601 and 602 are sampled signals for which synchronization between the respective sample rates is desired. As mentioned above, signals 601 and 602 may correspond to any of a wide variety of signals in a wide variety of contexts between which synchronization to varying degrees of accuracy is required. The sample rate for signal 601 is converted in a variable sample rate converter (VSRC 604) designed according to the present invention, the conversion ratio being controlled via a control loop. VSRC 604 may be, for example, similar to the implementation described above with reference to FIG. 3. According to a specific embodiment, it is specifically the downsampling factor associated with VSRC 604 which is varied using the control loop.

A difference signal is generated (block 614) using some representation of signal 601 and some representation of signal 602. The difference signal is representative of the difference between the sample rates of signals 601 and 602. It should be noted that, according to different embodiments, the difference signal may be generated from the raw signals for which synchronization is desired, or any of a variety of processed versions of the raw signals including, for example, the sample-rate-converted version of either signal as discussed above. The variable nature of this aspect of the invention is represented by processing block 618.

Regardless of the signals used and according to one embodiment, the difference signal represents a running count of the samples received from the two signals, the samples from one of the signals making a positive contribution to the count and those from the other making a negative contribution. So, if the sample rates were equal, the difference signal would tend toward zero. Other techniques for generating such a difference signal are also contemplated such as, for example, more complex techniques which correlate signal characteristics in the two signals and determine differences in spacing between similar characteristics in the different signals.

The difference signal is then processed to determine the drift (block 616). As discussed above with reference to FIG. 4, this processing may be as simple as taking the average values of the difference signal to determine the diagonal trend of the signal. Alternatively, block 616 may represent a much more complex process such as the one discussed above in which outliers are rejected and third order feedback techniques are employed. In any case, it should be understood that a wide variety of techniques may be employed to process the difference signal and to thereby obtain a signal or value representative of an estimate of the difference between the sample rates of interest.

This estimate of the difference between the sample rates is then used to adjust the conversion ratio of VSRC 604. As mentioned above, this can be done using direct or indirect feedback techniques as represented by feedback loop 606. It can also be done by adjustment of either of the upsampling or downsampling factors associated with VSRC 604.

While the invention has been particularly shown and described with reference to specific embodiments thereof, it will be understood by those skilled in the art that changes in the form and details of the disclosed embodiments may be made without departing from the spirit or scope of the invention. For example, it should be understood that the determination of the difference between sample rates and the compensation therefor according to the present invention may apply to systems in which the difference between the relevant sample rates varies over time as well as to systems in which the difference between the sample rates is fixed. In the former case, the techniques of the present invention may be used to monitor and correct the imbalance on an ongoing basis. In the latter case, the techniques of the present invention may be applied to identify the difference once as well as provide subsequent refinements to the original estimate over time.

More generally, the present invention can be employed in any signal processing context in which synchronization between the sample rates of two signals is desired. Thus, although the examples discussed above relate to digital audio signal processing, the present invention is not so limited.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. At least one computer readable medium having computer program instructions stored therein for performing a variable sample rate conversion, the computer program instructions comprising:

first instructions for tracking a difference between a first sample rate associated with a first signal and a second sample rate associated with a second signal;

second instructions for adjusting a sample rate conversion ratio in response to the difference; and third instructions for converting one of the first and second sample rates using the conversion ratio.

2. The at least one computer readable medium of claim 1 wherein the first instructions are operable to track the difference by tracking a sample count in which samples associated with the first signal make a positive contribution to the sample count and samples associated with the second signal make a negative contribution to the sample count.

3. The at least one computer readable medium of claim 2 wherein the first instructions are operable to track the sample count by estimating an average rate of change of the sample count.

4. The at least one computer readable medium of claim 3 wherein the first instructions are operable to estimate the average rate of change by excluding values of the sample count which deviate from a median value of the sample count by more than a threshold amount.

5. The at least one computer readable medium of claim 3 wherein the first instructions are operable to estimate the average rate of change using any of least mean squares analysis, cluster analysis, and histogram analysis.

6. The at least one computer readable medium of claim 1 wherein the first instructions are operable to track the difference with reference to the converted one of the first and second sample rates.

7. The at least one computer readable medium of claim 1 wherein the first instructions are operable to track the difference by correlating signal characteristics in the first and second signals and determining spacing differences between similar characteristics in the first and second signals.

8. The at least one computer readable medium of claim 1 wherein the second instructions are operable to adjust the sample rate conversion ratio using a feedback signal generated in response to the difference.

9. The at least one computer readable medium of claim 8 wherein the feedback signal comprises any of a first order feedback signal, a second order feedback signal, and a third order feedback signal.

10. The at least one computer readable medium of claim 1 wherein the second instructions are operable to adjust the sample rate conversion ratio using a fixed increment.

11. The at least one computer readable medium of claim 1 wherein the second instructions are operable to adjust the sample rate conversion ratio using a variable increment.

12. The at least one computer readable medium of claim 11 wherein the variable increment is determined with reference to a magnitude of the difference.

13. The at least one computer readable medium of claim 1 wherein the second instructions are operable to calculate an adjustment to the conversion ratio with reference to the difference.

14. The at least one computer readable medium of claim 1 wherein the second instructions are operable to adjust the sample rate conversion ratio at different speeds.

15. The at least one computer readable medium of claim 14 wherein the different speeds are determined with reference to a magnitude of the difference.

16. The at least one computer readable medium of claim 1 wherein the third instructions are operable to convert the one of sample rates using an upsampling factor, a filter, and a downsampling factor, the conversion ratio comprising a ratio of the upsampling and downsampling factors.

17. The at least one computer readable medium of claim 16 wherein the second instructions are operable to adjust the conversion ratio by adjusting one of the upsampling and downsampling factors.

18. The at least one computer readable medium of claim 16 wherein the filter has a plurality of filter coefficients associated therewith, and the third instructions are operable to store the filter coefficients in consecutive memory locations in an order in which the filter coefficients are used.

19. The at least one computer readable medium of claim 16 wherein the variable sample rate conversion is performed in a system in which signal degradation occurs to to signal associated with the one of the first and second sample rates being converted, the signal degradation relating to at least one factor external to the variable sample rate conversion, the filter being configured to mitigate at least a portion of the signal degradation.

20. The at least one computer readable medium of claim 1 wherein the third instructions are operable to convert the one of the first and second sample rates to be substantially the same as the other of the first and second sample rates.

21. The at least one computer readable medium of claim 1 wherein the first and second signals both represent digitized acoustic energy, the third instructions being operable to convert the one of the first and second sample rates to facilitate synchronization of the first and second signals.

22. The at least one computer readable medium of claim 21 further comprising fourth instructions for performing echo cancellation with the first and second signals.

23. A digital signal processing system comprising the at least one computer readable medium of claim 1.

24. The digital signal processing system of claim 23 comprising either of a single computer and a plurality of computers interconnected via a network.

25. The digital signal processing system of claim 23 wherein the first and second signal are associated with sound card circuitry.

26. A method for performing a variable sample rate conversion, comprising:
   tacking a difference between a first sample rate associated with a first signal and a second sample rate associated with a second signal;
   adjusting a sample rate conversion ratio in response to the difference; and
   converting one of the first and second sample rates using the conversion ratio.

27. At least one computer readable medium having computer program instructions stored therein for performing the method of claim 26.

28. A programmable logic device configured to perform the method of claim 26.

29. An application-specific integrated circuit for performing the method of claim 26.

30. At least one computer readable medium having computer program instructions stored therein for performing echo cancellation, the computer program instructions comprising:
   first instructions for tracking a difference between a first sample rate associated with a first signal and a second sample rate associated with a second signal;
   second instructions for adjusting a sample rate conversion ratio in response to the difference;
   third instructions for converting the first sample rate using the conversion ratio, thereby generating a modified first signal and facilitating synchronization of the modified first signal and the second signal; and
   fourth instructions for performing echo cancellation using the modified first signal and the second signal.

31. A computer telephony system comprising the at least one computer readable medium of claim 30.

32. At least one computer readable medium having computer program instructions stored therein for performing echo cancellation, the computer program instructions comprising:
   first instructions for tracking a difference between a first sample rate associated with a first signal and a second sample rate associated with a second signal by tracking a sample count in which samples associated with the first signal make a positive contribution to the sample count and samples associated with the second signal make a negative contribution to the sample count;

second instructions far adjusting a downsampling factor using a feedback signal generated by a third order control system with reference to the difference;

third instructions for converting the first sample rate using an upsampling factor, a filter, and the downsampling factor, thereby generating a modified first signal and facilitating synchronization of the modified first signal and the second signal; and fourth instructions for performing echo cancellation using the modified first signal and the second signal.

33. At least one computer readable medium having computer program instructions stored therein for converting a sample rate using an upsampling factor, a filter, and a downsampling factor, the filter having a plurality of filter coefficients associated therewith, the instructions being operable to store the filter coefficients in consecutive memory locations in an order in which the filter coefficients are used.

34. The at least one computer readable medium of claim 33 wherein conversion of the sample rate is performed in a system in which signal degradation occurs to a signal associated with the sample rate being converted, the signal degradation relating to at least one factor external to the sample rate conversion, the filter being configured to mitigate at least a portion of the signal degradation.

* * * * *